(12) United States Patent
Takao (10) Patent No.: US 8,150,233 B2
(45) Date of Patent: Apr. 3, 2012

(54) APPARATUS FOR AND METHOD OF ANALYZING VIDEO CONTENTS

(75) Inventor: Yuji Takao, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 12/404,985

(22) Filed: Mar. 16, 2009

(65) Prior Publication Data

US 2009/0296825 A1 Dec. 3, 2009

(30) Foreign Application Priority Data

May 27, 2008 (JP) ................. 2008-138395

(51) Int. Cl.
*H04N 9/80* (2006.01)
(52) U.S. Cl. ......... 386/249; 386/239; 386/248; 386/250
(58) Field of Classification Search .............. 386/46, 386/83, 95, 239, 248, 249, 250, 251, 296
See application file for complete search history.

(56) References Cited

U.S. PATENT DOCUMENTS

| | | | | |
|---|---|---|---|---|
| 7,120,351 | B2 * | 10/2006 | Engle et al. .............. | 386/35 |
| 2006/0263062 | A1 | 11/2006 | Takao | |
| 2007/0209055 | A1 * | 9/2007 | Koga et al. .............. | 725/101 |

FOREIGN PATENT DOCUMENTS

| | | |
|---|---|---|
| JP | 2001-503933 | 3/2001 |
| JP | 2005-277754 | 10/2005 |
| JP | 2006-303868 | 11/2006 |
| JP | 2007-049380 | 2/2007 |
| JP | 2007-267211 | 10/2007 |
| WO | WO 96/08921 A | 3/1996 |
| WO | WO 98/07273 | 2/1998 |

OTHER PUBLICATIONS

European Search Report for Application No. EP 09153173.1-1241 dated May 28, 2009.
Notification of Reasons for Rejection issued by JPO in the corresponding to the Japanese Patent Application No. 2008-138395 on May 12, 2009.
Information Sheet for preparing an Information Disclosure Statement under Rule 1.56.
An English Translation of Notification of Reasons for Rejection mailed by Japan Patent Office for Japanese Patent Application 2008-138395 on May 12, 2009.

* cited by examiner

*Primary Examiner* — Thai Tran
*Assistant Examiner* — Hung Dang
(74) *Attorney, Agent, or Firm* — Knobbe, Martens, Olson & Bear, LLP (57) ABSTRACT

According to one embodiment, in an apparatus according to the present invention, an event detection module detects a section in which a specific feature is produced from video images. An event time information storage module stores therein a start time, and an end time of the detected event section, obtains an analysis time between the start time and the end time, and stores therein the obtained analysis time. A plural event section specification module specifies event sections adjacent to each other as event sections in a group, when an interval between two analysis times adjacent to each other satisfies a predetermined condition. And a video image type distinction module distinguishes first and second types of video image, the first type being sections in the group and the second type being other sections.

8 Claims, 11 Drawing Sheets

APPARATUS FOR AND METHOD OF ANALYZING VIDEO CONTENTS

CROSS-REFERENCE TO RELATED APPLICATIONS

This application is based upon and claims the benefit of priority from Japanese Patent Application No. 2008-138395, filed May 27, 2008, the entire contents of which are incorporated herein by reference.

BACKGROUND

1. Field

One embodiment of the invention relates to an apparatus for and a method of analyzing video contents, which are effective when a specific signal section included in the video/audio data is detected, and the video/audio data is edited.

2. Description of the Related Art

In a television broadcasting signal, a commercial (CM) break is provided at a boundary between programs or in the middle of a program. Now, it is assumed here that a section in which one commercial is broadcast is defined as a commercial section, and a section in which a plurality of commercials are consecutively broadcast is defined as a group commercial section. As a method of detecting the commercial section in a recording/reproducing apparatus, there is a method of detecting a black frame between a program main part and a commercial section, and detecting, in a group commercial section, a black frame present between commercial sections adjacent to each other. It is possible to skip an entire group section by referring to a detection timing of a black frame, and reproduce only a program main part.

However, the number of frames of the black frames differs depending on the program in some cases, and when a plurality of commercial sections are present consecutively, an error is caused in the skip length in some cases, and an unnecessary image is mixed with the program main part in some cases.

Further, as a method of detecting a commercial section, the following method has been developed (for example, US 2006/0263062A1). A section in which a sound level is equal to or below a threshold for a predetermined time is determined to be a silent part by using a sound signal, and it is determined whether or not a time interval between a silent part and the next silent part is a multiple of a certain time (A: for example, 15 s). If the time interval is a multiple of the certain time (A), detection of a silent part is counted. Further, if the counted number of the silent parts is a threshold (B) or more, section information is set for each of the first and last appearing silent parts. However, a time span of the silent part (a section in which the sound level is below a threshold) is not always constant. For this reason, when a time interval between a silent part and the next silent part is measured, a setting position of a reference time in the silent part becomes a problem. That is, depending on which of a top position and an end position of the silent part is set as the reference time, a result of the measurement of the time interval becomes inaccurate in some cases. When the measurement result is inaccurate, the distinction between the commercial section and the program main part becomes inaccurate.

In the prior art technique, in the middle of a continuously reproduced image in which a commercial section is skipped, an unrelated frame image (residual image of the commercial section) is seen at a part in some cases. Thus, there is a demand for further accurate detection of a specific section such as a commercial section and the like.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

In an embodiment according to the present invention, an interval between analysis times of event sections is used to group a plurality of event sections into types. After determining that the interval satisfies a predetermined condition, an image from the first event section to the last event section is classified as a first type. Even when the length of the event section varies, detection of a plurality of event sections as a group is accurate, and hence erroneous detection in the event section is reduced, range determination of the plurality of event sections becomes accurate, and the distinction between images of the first type and second type becomes accurate.

An embodiment of the invention will be described below more specifically with reference to the accompanying drawings. This signal processing apparatus can be applied to, for example, a digital television receiving apparatus, an information recording/reproducing apparatus, or the like.

Figure 1:
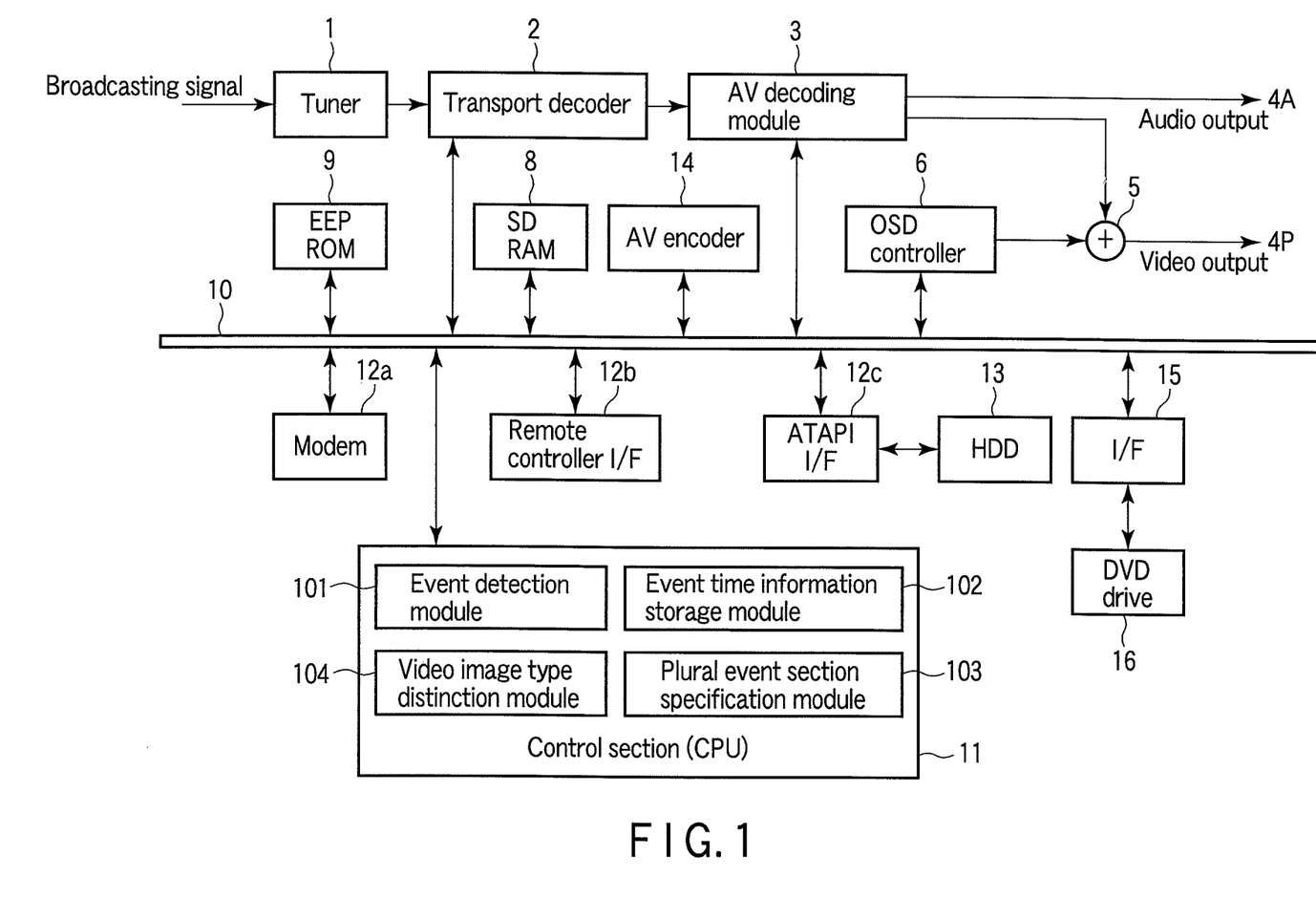
FIG. 1 is a view showing a configuration example of a signal processing apparatus to which the present invention is applied.

A tuner 1 receives, for example, a digital broadcasting signal, demodulates the received signal, and supplies a demodulated output to a transport decoder 2. Video data/audio data of a program selected by the transport decoder 2 is input to an audio/video (AV) decoder 3 for each packet, and is decoded. The audio output decoded by an AV decoding module 3 is output to an output terminal 4A, and the video output is output to an output terminal 4P. Video data from an onscreen display (OSD) controller 6 is combined with the video data of the output terminal 4P by a combination circuit 5 in some cases.

An SDRAM 8 is utilized when data is temporarily stored, and when, for example, a received signal is subjected to error correction processing or the like. Further, an EEPROM 9 is utilized to store, for example, a program for executing a function of a device or a parameter.

A reference symbol 10 denotes a main bus, which is connected to the transport decoder 2, AV decoding module 3, OSD controller 6, SDRAM 8, EEPROM 9, and the like. Further, a CPU 11 serving as a control section for exercising control over the apparatus is connected to the main bus 10. Further, the apparatus can be connected to an external equipment through the bus 10. Accordingly, a modem interface 12a, remote controller interface 12b, and ATAPI interface 12c are connected to the main bus 10. A hard disk drive (HDD) 13 can be connected to the bus 10 through the interface 12c.

The AV stream separated by the transport stream decoder 2 can be recorded on the HDD 13 through the ATAPI interface 12c. At the time of reproduction, the AV stream read from the HDD 13 is decoded by the AV decoding module 3.

The AV decoding module 3 can reproduce an audio signal and a video signal from the transport stream. Further, an audio signal and a video signal can be reproduced from an audio stream and a video stream of the DVD format. Further, the AV decoding module 3 may be configured to be able to reproduce an audio signal and a video signal from a signal of some other standard.

Further, an AV encoder 14 is connected to the main bus 10 and, in order to record the video data on a recording medium, the AV encoder 14 can convert video data into data of a predetermined format (for example, the DVD format, transport stream, baseband, and so on). The converted AV information is recorded on, for example, the HDD 13.

Further, a DVD drive 16 may be connected to the main bus 10 through an interface 15. Further, information of the DVD format may be recorded on an optical disk through the DVD drive 16, or may be reproduced from an optical disk.

The CPU 11 controls each of the blocks described above in a unifying manner. Further, inside the CPU 11, an event detection module 101, event time information storage module 102, plural event section specification module 103, and video image type distinction module 104 are provided.

The event detection module 101 detects an event section in which a specific feature is produced from an image decoded by the AV decoding module 3 as an event section. The event time information storage module 102 stores therein the start time, and the end time of the detected event section, and the analysis time between the start time and the end time. It is desirable that the analysis time is the central time between the start time and the end time. However, the analysis time may be the time equal to the central time ±α.

The plural event section specification module 103 specifies, when an interval between analysis times adjacent to each other required of event sections adjacent to each other satisfies a predetermined condition, the event sections adjacent to each other. The video image type distinction module 104 is a part for distinguishing the first to the last event sections of the specified plural event sections as the first type of video image, and distinguishing others as the second type of video image. Further, the video image type distinction module 104 can also generate distinction information. This distinction information is associated with compressed video data encoded by the AV encoder 14 as a piece of management information. Further, the distinction information is recorded on the HDD 13 together with the compressed video data.

Figure 2:
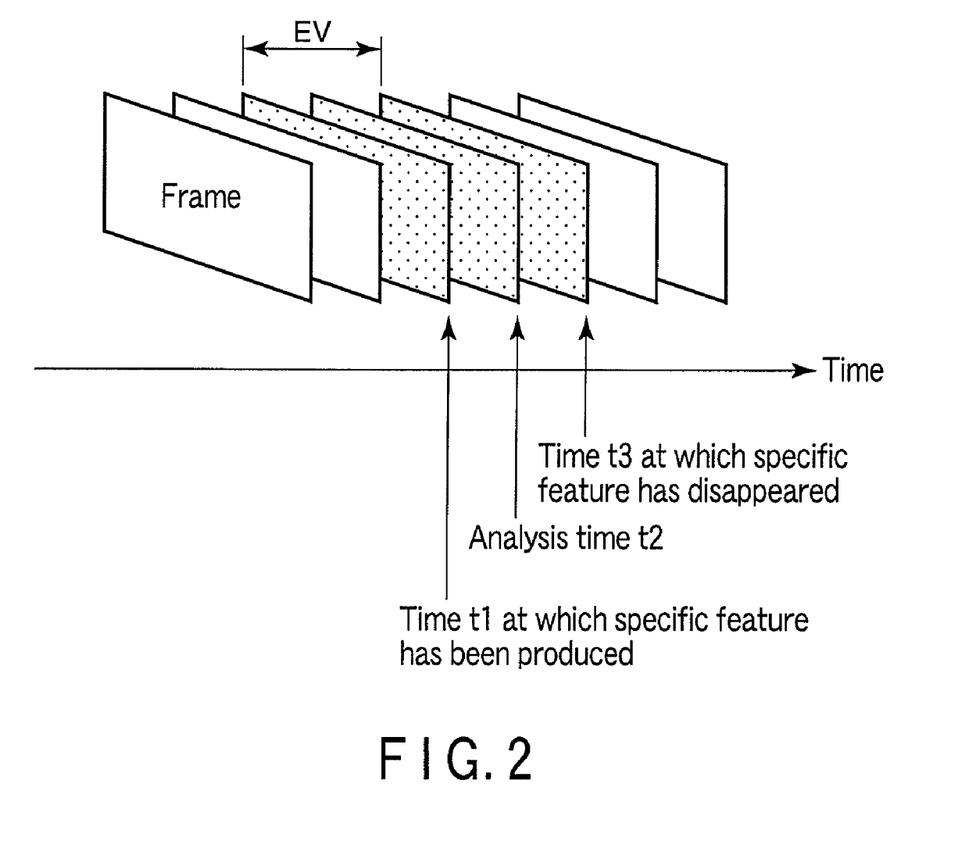
FIG. 2 is a view showing an example of a method of detecting an event.

FIG. 2 shows an example of an event detection method. The event detection module 101 monitors decoded video data in units of frames, and determines whether or not the whole frame is of a specific color (for example, blue). In this case, the color is not necessarily blue, other colors may be used, and it may be determined whether or not one frame is monochromatic. Further, the time at which the whole frame has changed to a specific color (monochrome) is defined as the time (t1) at which a specific feature has been produced, and the time at which the frame has changed from the specific color to the ordinary video contents is defined as the time (t3) at which the specific feature has disappeared. Further, the analysis time of the time t1 and the time t3 is calculated and is made the analysis time (t2). The analysis time is, for example, the time between the time t1 and the time t3. Further, from the time t1 to the time t3 is defined as an event section (EV).

By detecting the event section as described above, it is possible to detect a plurality of event sections (EV1, EV2, EV3, and EV4). The event time information storage module 102 temporarily stores therein the time at which the specific feature of each event section is produced, the time at which the specific feature disappears, and the analysis time of the respective times. Further, the plural event section specification module 103 determines whether or not a time difference between central times of event sections adjacent to each other is n seconds or a multiple of n seconds. Further, if the time difference between the central times of the event sections adjacent to each other is n seconds or a multiple of n seconds, this period is specified as a plural event section.

Further, the video image type distinction module 104 distinguishes a video image from the start time of the first event section to an end time of the last event section of the specified plural event sections as the first type, and distinguishes images other than the above as the second type.

Figure 3:
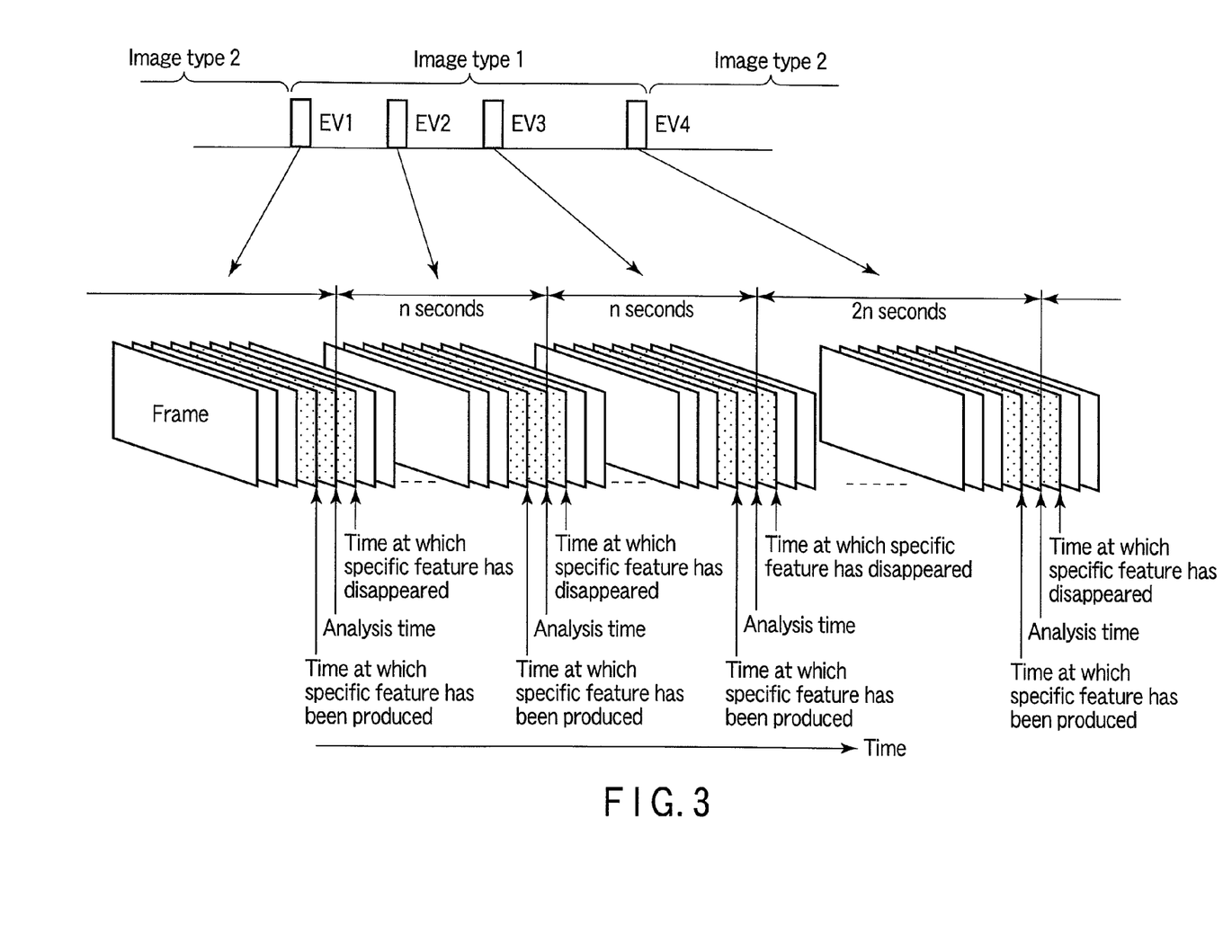
FIG. 3 is an explanatory view showing an example of conditions of a case where a plurality of event sections are specified as a group.

In the example shown in FIG. 3, when a plurality of event sections are specified as a group, it is conditioned that a time difference between analysis times of event sections adjacent to each other be n seconds or a multiple of n seconds. However, the time difference is not limited to the above. As n seconds, there are, for example, 10 seconds, 20 seconds, 30 seconds, and the like.

Figure 4:
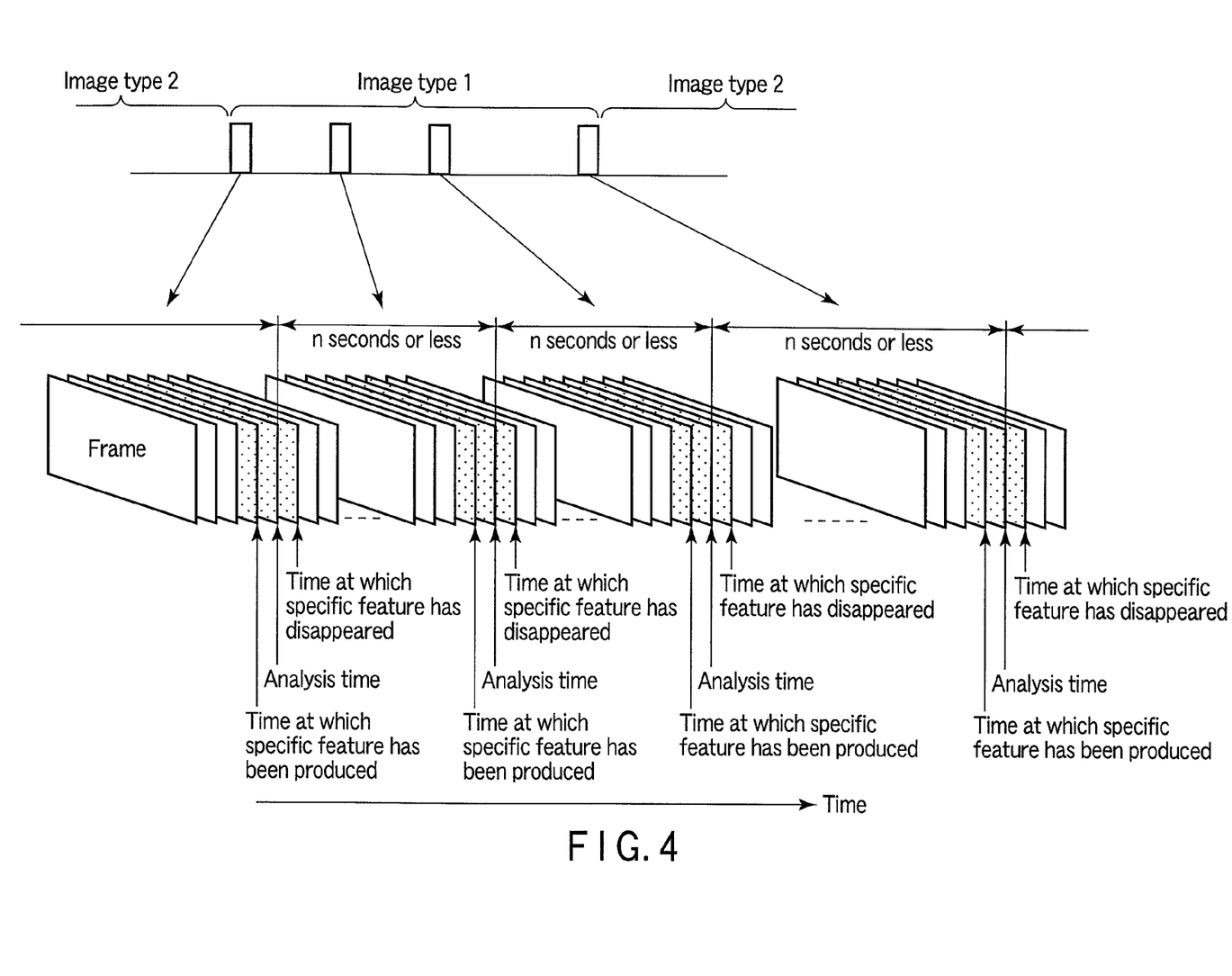
FIG. 4 is an explanatory view showing another example of conditions of a case where a plurality of event sections are specified as a group.

The example shown in FIG. 4 is an example in which a range of plural event sections as a group is recognized on condition that a time difference between analysis times of event sections adjacent to each other be n seconds or less.

As described above, after determining that an interval between analysis times of event sections satisfies a predetermined condition, a video image from the first event section to the last event section is distinguished as the first type. By virtue of this, mistaken detection of an event section is reduced, the range determination of plural event sections becomes accurate, and the distinction between a video image of the first type and that of the second type also becomes accurate.

Depending on the commercial, there are short event sections, and long event sections, and if a commercial section is specified uniformly on the basis of only information on the top part of the event, mistaken detection of the commercial section may occur in some cases. However, according to the present invention, the time between the analysis times of the event sections is measured, and hence such mistaken detection is reduced.

Figure 5:
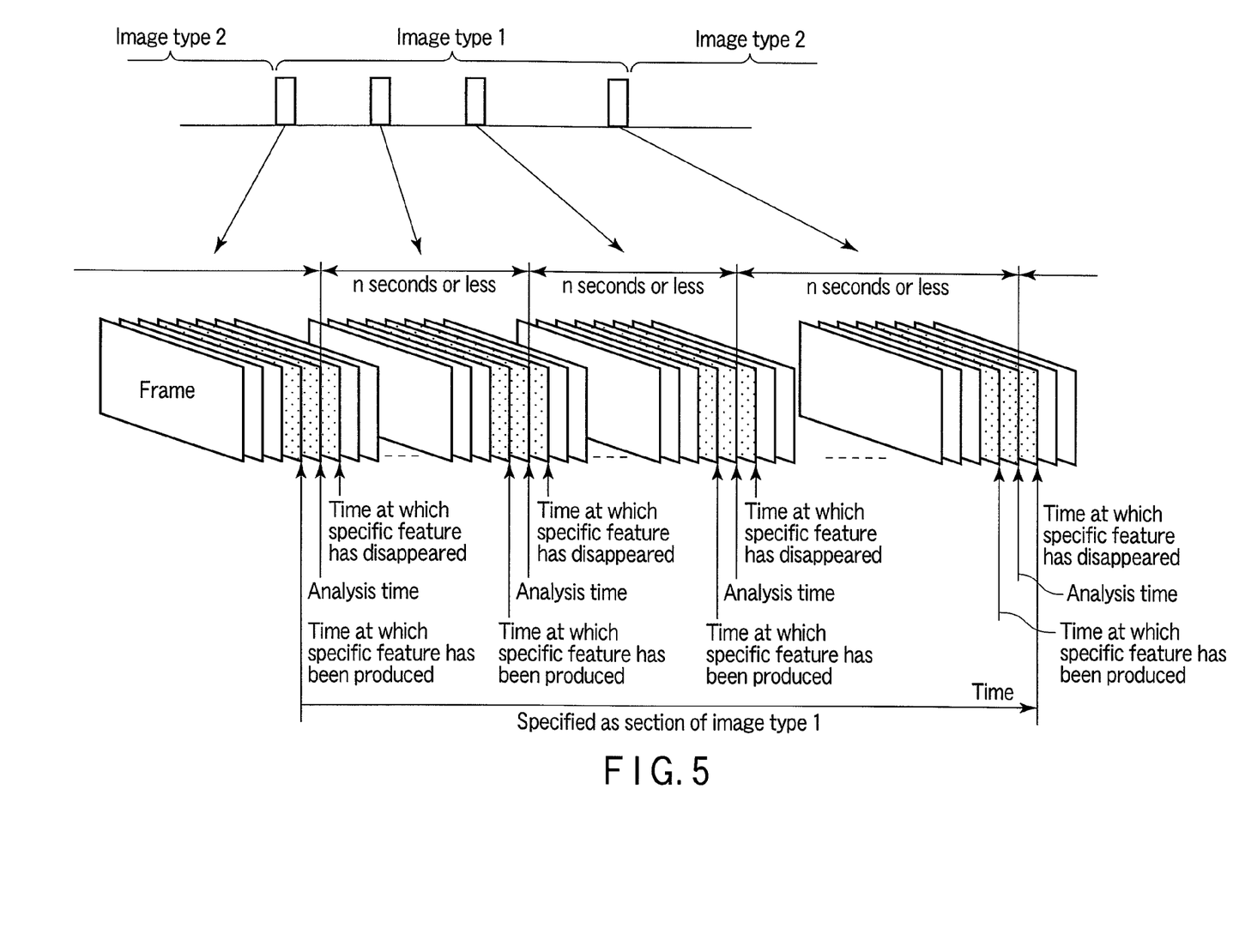
FIG. 5 is an explanatory view showing division points of a case where a plurality of event sections are classified as a first type of image, and another parts are classified as a second type of image.

Next, in the present invention, the video image type distinction module 104 sets a video image from the start time of the first event section to an end time of the last event section of the plural event sections as the first type of video image, and sets images other than the above as the second type. Accordingly, the first type of video images and the second type of video images other than the above are accurately separated and distinguished from each other in units of frames. The view showing this state is FIG. 5. That is, it is possible to set from the start time of the first event section (EV1) to the end time of the last event section (EV4) of the plural event sections as a section of the first type of video image.

In the above embodiment, it has been determined whether or not the whole frame is monochromatic to detect an event section. However, the method is not limited to this, and the following method may also be employed. That is, a silent period is present as an instant at each of the beginning and end of a commercial period, and hence the periods are utilized as the same detection result as the event section described previously. It should be noted that the silent period detection does not imply the complete sound zero level, and implies detection of the fact that the sound level has become less than a predetermined level.

Figure 6:
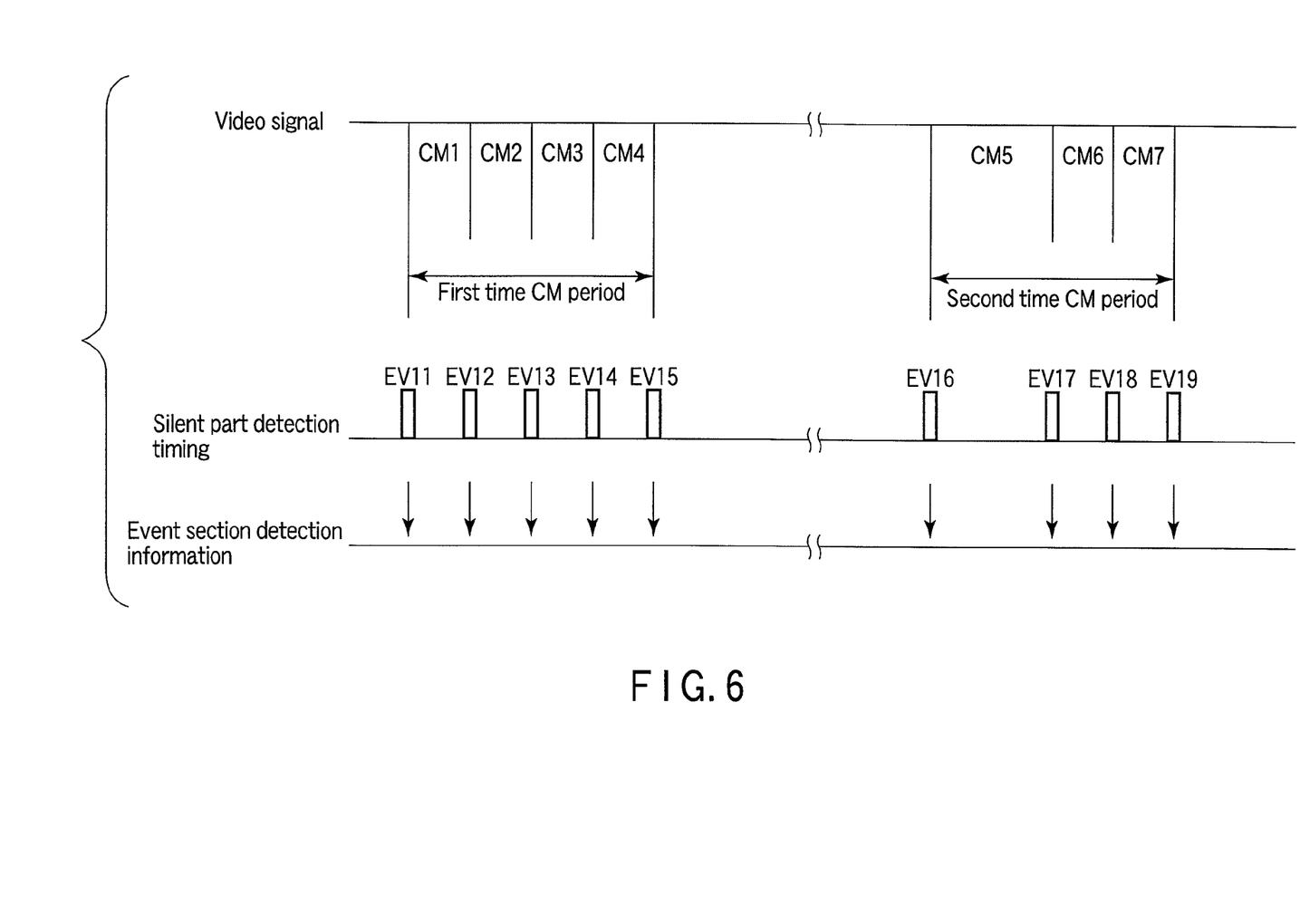
FIG. 6 is a view showing an example of an operation timing chart of a case where a silent event section is detected.
Figure 7:
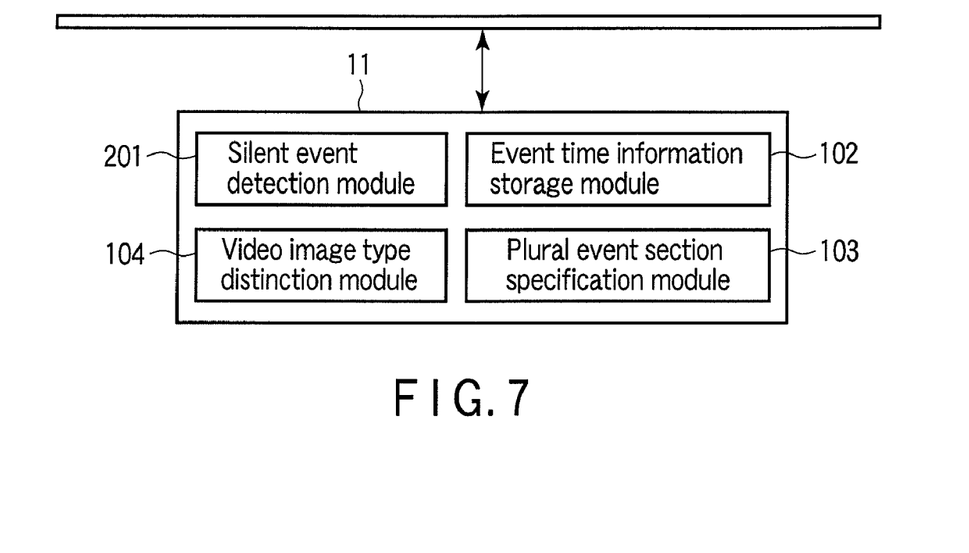
FIG. 7 is a view showing a configuration example of a control section for obtaining an operation timing chart in the case where the silent event section is detected in FIG. 6.

FIGS. 6 and 7 show the operation to be performed when a silent event section is detected by detecting a silent part, and the inside of the control section 11. In this case too, the start time and end time of the silent part are determined, then the analysis time of the start time and the end time is obtained by calculation, and the calculated result is stored in the memory.

As the video signal, an example in which CM1, CM2, CM3, and CM4 are present in the middle of the program main part as the first commercial, and CM5, CM6, and CM7 are present as the second commercial is shown. At the boundaries between the commercials, event sections EV11 to EV19 are present. A silent event detection module 201 determines that the time at which the audio signal level changes to a predetermined threshold or less is the start of the event section, and the time at which the audio signal level changes from the predetermined threshold or less to the threshold or more is the end of the event section. An event time information storage module 102 stores therein the start time, and end time of the detected event section, obtains the analysis time between the start time and the end time, and stores therein the obtained analysis time.

The subsequent processing is the same as that in the embodiment shown in FIG. 1. That is, inside the CPU 11, a plural event section specification module 103 for specifying, when a time interval between adjacent analysis times required of silent event sections adjacent to each other satisfies a predetermined condition, the event sections adjacent to each other as a group, and a video image type distinction module 104 for distinguishing the first to the last event sections of the specified plural event sections as the first type of video image, and distinguishing others as the second type of video image are provided.

Figure 8:
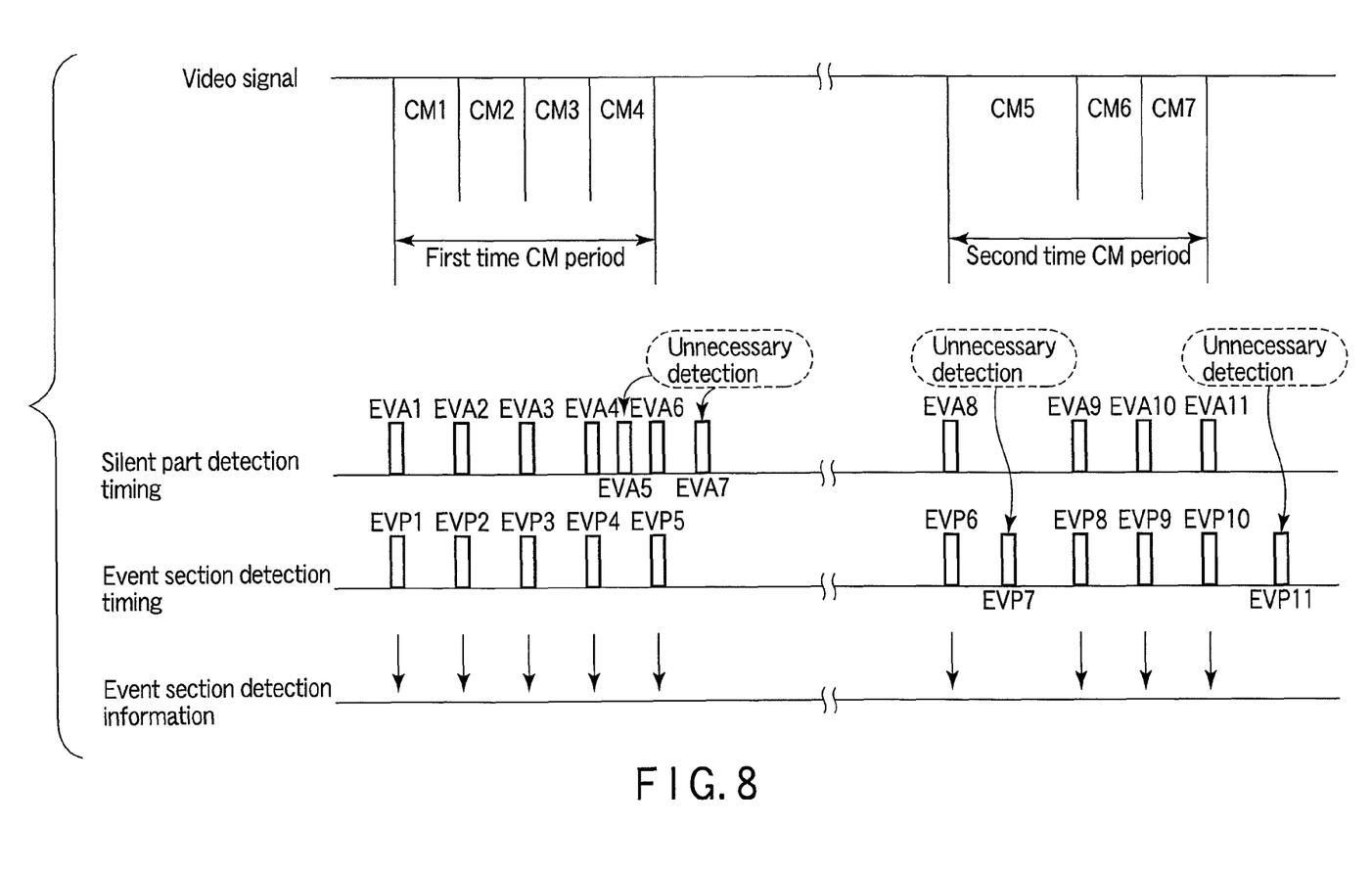
FIG. 8 is a view showing an example of a timing chart of a case where a monochromatic event section and silent event section are detected.
Figure 9:
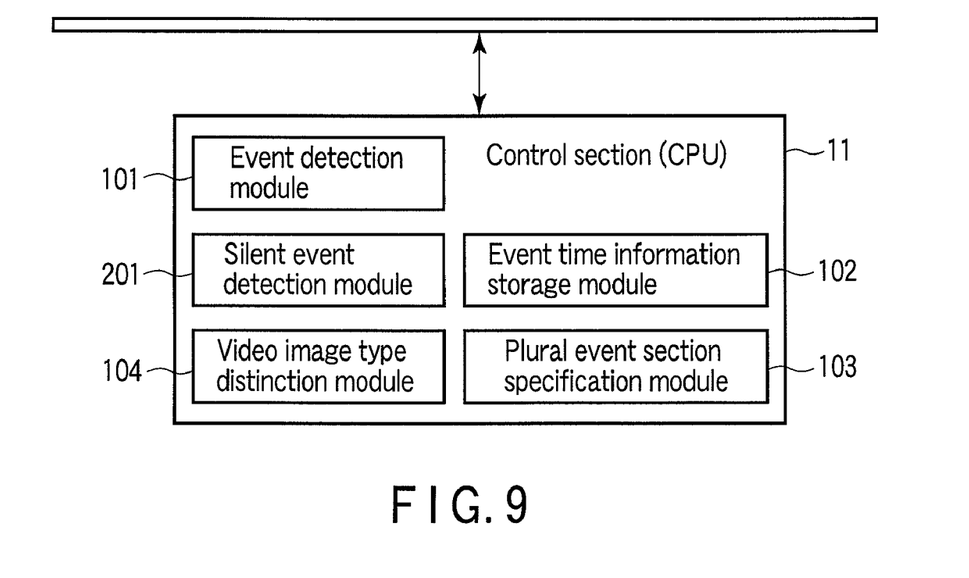
FIG. 9 is a view showing a configuration example of a control section for obtaining an operation timing chart in the case where the monochromatic event section and silent event section are detected in FIG. 8.

FIGS. 8 and 9 each show an embodiment in which the embodiment of FIG. 1 and the embodiment of FIGS. 6 and 7 are combined with each other. This embodiment is an example in which it is determined that the time at which the whole frame of the video image has changed to a monochrome, and the audio signal level has changed to a predetermined threshold or less is the start of the event section, and the time at which the whole frame of the video image has changed from the monochrome to the ordinary image state, and the audio signal level has changed from the predetermined threshold or less to the threshold or more is the end of the event section.

According to this embodiment, even when unnecessary event sections EVA5, EVA7, EVP7, and EVP11 which are mistakenly detected are present, these event sections are never employed. Inside a control section 11, as shown in FIG. 9, an event detection module 101, silent event detection module 201, event time information storage module 102, plural event section specification module 103, and video image type distinction module 104 are present.

Figure 10:
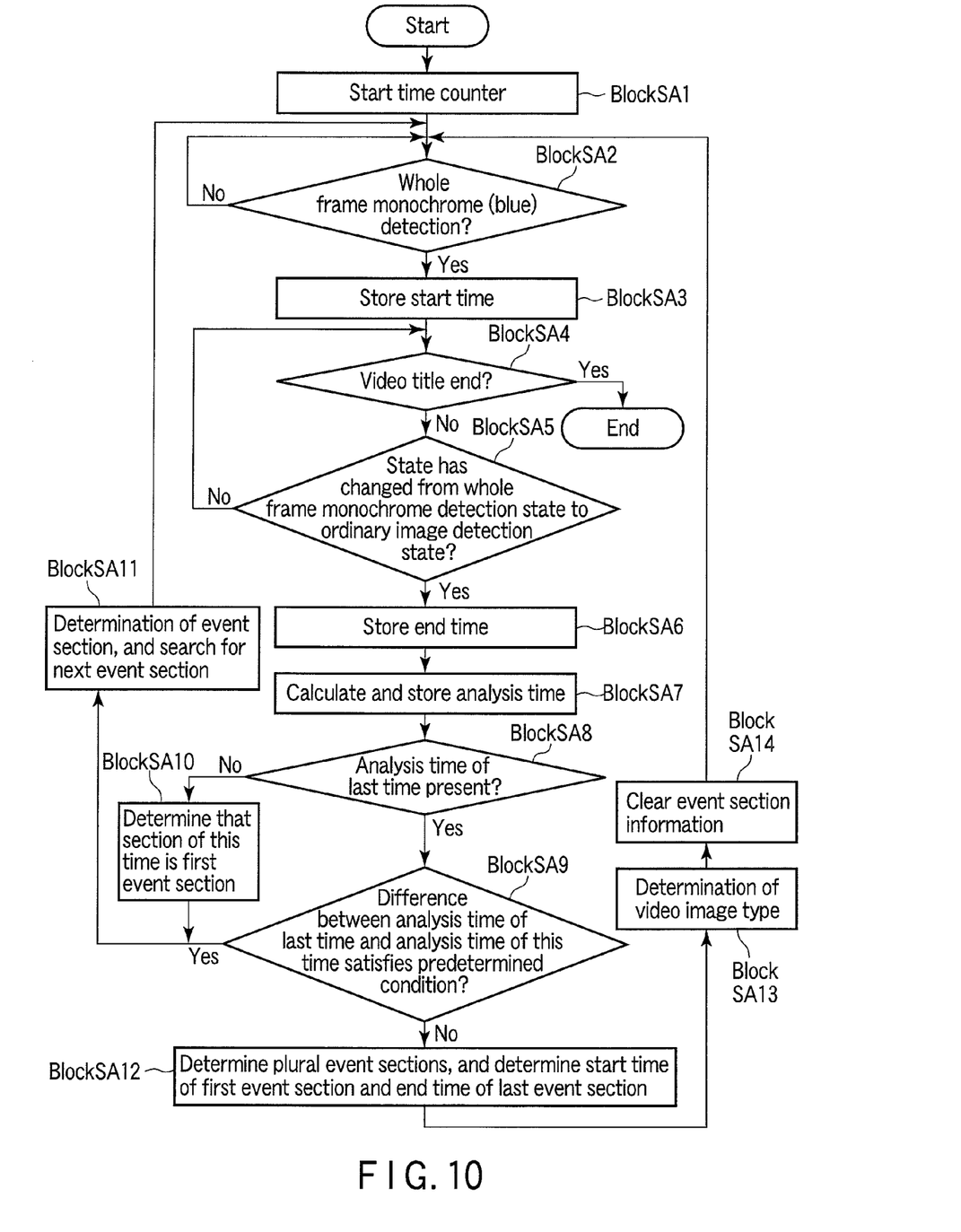
FIG. 10 is a view showing an example of a flowchart of a case where a monochromatic event section is detected.

FIG. 10 shows an operation flowchart of the first embodiment. When reproduction from the head of the video title is started, a time counter is started (block SA1). Then, it is determined whether or not the whole frame has been changed to a monochrome (block SA2). The time at which the frame has changed to the monochrome is recognized as the start of an event section, and the start time is stored (block SA3). While it is being checked whether or not the reproduction of the video title has been completed (block SA4), it is determined whether or not the state has been changed from the whole frame monochrome detection state to the ordinary image detection state (block SA5).

When the reproduction of the video title has been completed, the operation is terminated. When the state has changed from the whole frame monochrome detection state to the ordinary image detection state, the end time is stored (block SA6), the intermediate analysis time is then calculated, and the calculated analysis time is stored in the event time information storage module 102 (block SA7).

In the next block, it is determined whether or not the analysis time information of the last time in the group is present. When the analysis time information of the last time is not present, it is recognized that the section of this time is the first event section (block SA10), and the flow is shifted to the search for the next event section (block SA11→SA2).

When the analysis time information of the last time in the group is present in block SA8, it is determined whether or not a difference between the analysis time of the last time and the analysis time of this time satisfies a predetermined condition (block SA9). When the difference satisfies the predetermined condition, the event section of this time is specified as that in the group, and the flow is shifted to the search for the next event section.

When the difference between the analysis time of the last time and the analysis time of this time does not satisfy the predetermined condition, it is determined that the event section of this time is not in the group, the plural event sections detected so far are determined, and the start time of the first (leading) event section, and the end time of the last event section are determined (block SA12).

Then, the flow is shifted to block SA13, determination of the video image type is performed, the event section information acquired so far is cleared (block SA14), and the flow is returned to block SA2. Then, the flow is shifted to the search for the next plural event sections.

Figure 11:
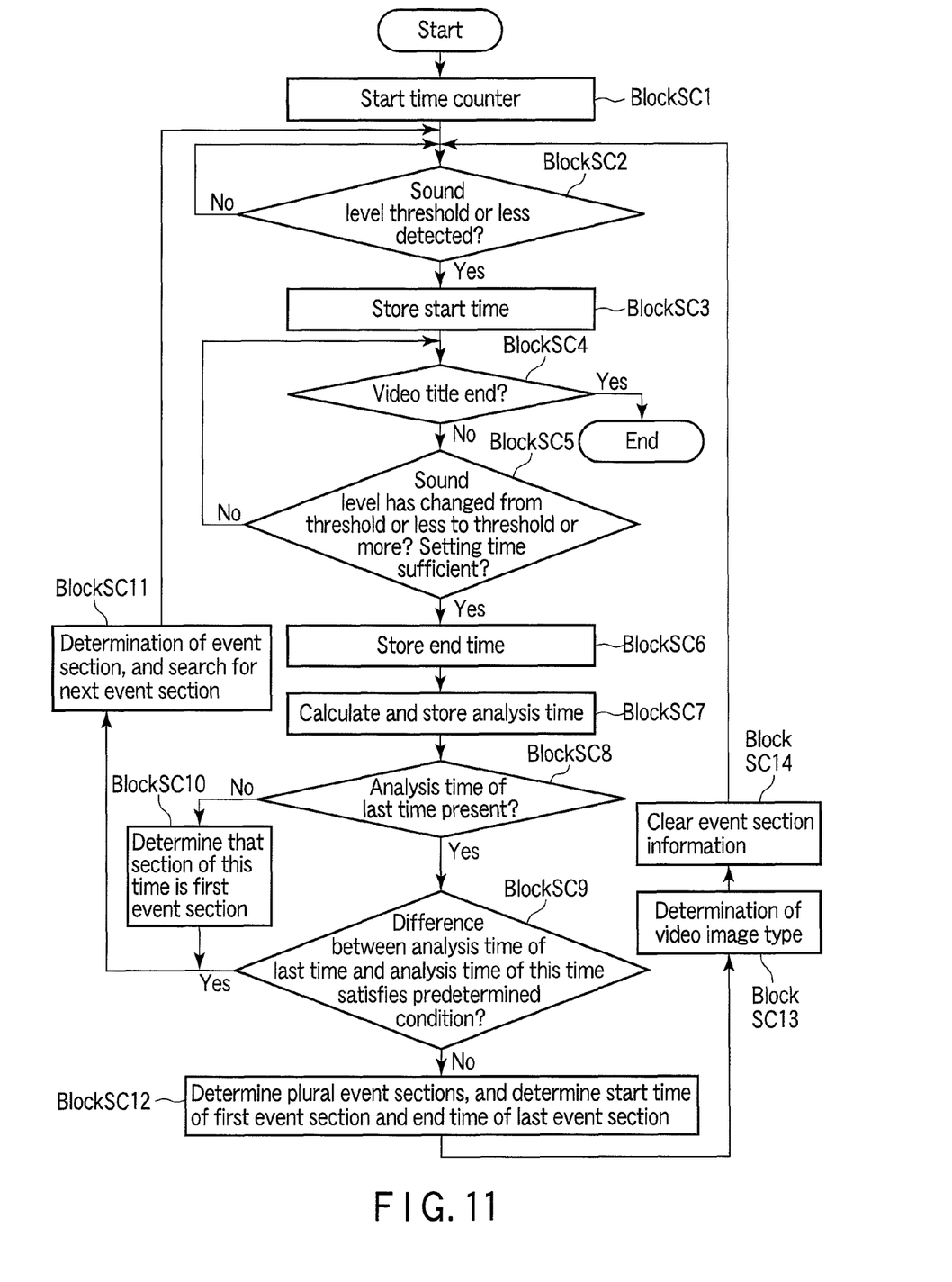
FIG. 11 is a view showing an example of a flowchart of a case where a silent event section is detected.

FIG. 11 is a flowchart corresponding to the embodiment shown in FIG. 8. When reproduction from the head of the video title is started, a time counter is started (block SC1). It is determined whether or not the sound level has become a threshold or less (block SC2). The time at which the sound level has become the threshold or less is recognized as the start of an event section, and the start time is stored (block SC3). While it is being checked whether or not the reproduction of the video title has been completed (block SC4), it is determined whether or not the state has changed from the state where the sound level is the threshold or less to the state where the sound level is the threshold or more, and whether or not the time interval between the states for the change is sufficient (block SC5). The reason for confirming that the time interval has a certain width is to suppress a reaction to noise.

When the reproduction of the video title has been completed, the operation is terminated. When the sound level has changed from the threshold or less to the threshold or more, the end time is stored (block SC6), the intermediate analysis time is then calculated, and the calculated analysis time is stored in the event time information storage module 102 (block SC7).

In the next block, it is determined whether or not the analysis time information of the last time in the group is present. When the analysis time information of the last time is not present, it is recognized that the section of this time is the first event section (block SC10), and the flow is shifted to the search for the next event section (block SC11→SC2).

When the intermediate analysis time information of the last time in the group is present in block SC8, it is determined whether or not a difference between the analysis time of the last time and the intermediate analysis time of this time satisfies a predetermined condition (block SC9). When the difference satisfies the predetermined condition, the event section of this time is specified as that in the group, and the flow is shifted to the search for the next event section.

When the difference between the analysis time of the last time and the analysis time of this time does not satisfy the predetermined condition, it is determined that the event section of this time is not in the group, the plural event sections detected so far are determined, and the start time of the first (leading) event section, and the end time of the last event section are determined (block SC12).

Then, the flow is shifted to block SC13, determination of the video image type is performed, the event section information acquired so far is cleared (block SC14), and the flow is returned to block SC2. Then, the flow is shifted to the search for the next plural event sections.

Figure 12:
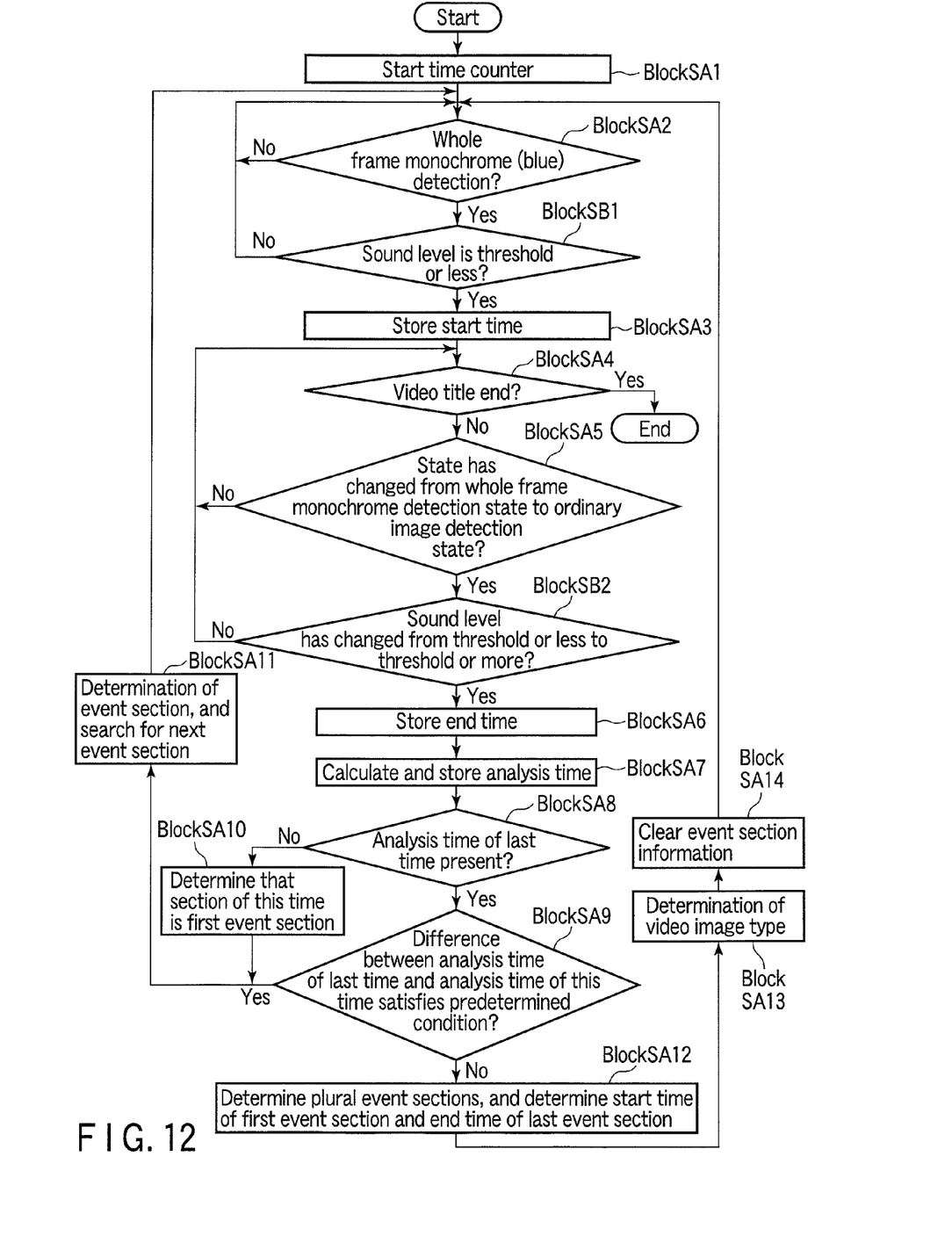
FIG. 12 is a view showing an example of a flowchart of a case where a monochromatic event section and silent event section are detected.

FIG. 12 shows an example in which the embodiments of FIGS. 10 and 11 are integrated with each other. FIG. 12 differs from FIG. 10 in the point that block SB1 is provided between block SA2 and block SA3, and it is determined whether or not the sound level is a threshold or less. Further, FIG. 12 differs from FIG. 10 in the point that it is determined whether or not the sound level has changed from the threshold or less to the threshold or more in a block between blocks SA5 and SA6. The other parts are identical with those in FIG. 10.

The type determination of the video image is performed with respect to, for example, a video signal which is a received signal from a tuner decoded by the AV decoder in FIG. 1. Further, the video type information is also recorded on the hard disk in association with the compression-processed AV data. Alternatively, the transport stream recorded on the hard disk is decoded by the AV decoder, and video image type information synchronizing with the video signal is also produced. Further, the video image type information is also recorded on the hard disk in association with the compression-processed AV data. When the compression-processed AV data is decoded by the AV decoder, the video image type information is also consulted, the part of the video image of the first type is skipped, and only the part of the video image of the second type is output. Conversely, only the part of the video image of the first type may be output. Selection of the type can be arbitrarily set by the user through the operation section.

As has been described above, according to the present invention, after determining that an interval between analysis times of event sections satisfies a predetermined condition, a video image from the first event section to the last event section is distinguished as the first type. As a result of this, mistaken detection of an event section is reduced, the range determination of plural event sections becomes accurate, and the distinction between a video image of the first type and that of the second type also becomes accurate. Even when the event sections vary, the detection of a plurality of event sections as a group becomes accurate.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus for analyzing video contents comprising:
   a decoding module configured to decode video and audio data;
   an event detection module configured to detect a section in which a specific feature is produced from video images decoded by the decoding module;
   an event time information storage module configured to store therein a start time and an end time of the detected event section, to obtain an analysis time which is a point in time after the start time and before the end time, and to store therein the obtained analysis time;
   a plural event section identification module configured to specify the event sections adjacent to each other as event sections in a group, when an interval between two analysis times of the event sections adjacent to each other satisfies a predetermined condition; and
   a video image type distinction module configured to distinguish a first type of video image and a second type of video image, the first type being sections in the group and the second type being other sections.

2. The apparatus for analyzing video contents of claim 1, wherein the video image type distinction module is configured to set the video from a start time of the first event section to an end time of the last event section of the plural event sections as the first type of video image, and to set the others as the second type of video image.

3. The apparatus for analyzing video contents of claim 2, wherein the event detection module configured to detect a specific portion with a feature is configured to determine that a time at which a whole frame of the video has changed to a monochrome state is a start of the event section, and a time at which the whole frame of the video has changed from the monochrome state to an ordinary image state is an end of the event section.

4. The apparatus for analyzing video contents of claim 2, wherein the event detection module configured to detect a specific portion with a feature is configured to determine that a time at which an audio signal level has changed to a predetermined threshold or a lower level is a start of the event section, and a time at which the audio signal level has changed from the predetermined threshold or a lower level to the threshold or a higher level is an end of the event section.

5. The apparatus for analyzing video contents of claim 2, wherein the event detection module is configured to determine that a time at which a whole frame of the video has changed to a monochrome state, and the audio signal level has changed to a predetermined threshold or a lower level is a start of the event section, and the time at which the whole frame of the video has changed from the monochrome state to an ordinary image state, and the audio signal level has changed from the predetermined threshold or a lower level to the threshold or a higher level is an end of the event section.

6. The apparatus for analyzing video contents of claim 2, wherein the first type of video is a commercial message.

7. An apparatus for analyzing video contents comprising:
  a decoding module configured to decode video and audio data;
  an event detection module configured to detect an event section from the decoded video by determining that a time at which a whole frame of the video has changed to a monochrome state, and/or a time at which the audio signal level has changed to a predetermined threshold or a lower level is a start of the event section, and a time at which the whole frame of the video has changed from the monochrome state to an ordinary image state, and/or a time at which the audio signal level has changed from the predetermined threshold or the lower level to the threshold or a higher level is an end of the event section;
  an event time information storage module configured to store therein a start time and an end time of the detected event section, to obtain an analysis time which is a point in time after the start time and before the end time, and to store therein the obtained analysis time;
  a plural event section identification module configured to specify the event sections adjacent to each other as event sections in a group, when an interval between two analysis times of the event sections adjacent to each other satisfies a predetermined condition; and
  a video image type distinction module configured to distinguish a first type of video image and a second type of video image, the first type being sections in the group and the second type being other sections.

8. The apparatus for analyzing video contents of claim 7, wherein the first type of video is a commercial message.

* * * * *